United States Patent
Moon et al.

(10) Patent No.: US 9,450,658 B1
(45) Date of Patent: Sep. 20, 2016

(54) METHOD FOR TRANSMITTING EXTRA SPATIAL LAYERS OVER THE WIRELESS CHANNEL

(71) Applicant: MEDIATEK INC., Hsinchu (TW)

(72) Inventors: Jangwook Moon, San Diego, CA (US); Tze-Ping Low, Lexington, MA (US)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/819,657

(22) Filed: Aug. 6, 2015

(51) Int. Cl.
*H04B 7/04* (2006.01)
*H04B 7/06* (2006.01)

(52) U.S. Cl.
CPC .......... *H04B 7/0486* (2013.01); *H04B 7/0626* (2013.01); *H04B 7/0697* (2013.01)

(58) Field of Classification Search
CPC H04B 7/0456; H04B 7/0626; H04B 7/0478; H04B 7/0639; H04B 7/0417; H04B 7/0486; H04B 7/0697; H04B 7/0632
See application file for complete search history.

(56) References Cited

U.S. PATENT DOCUMENTS

| | | | | |
|---|---|---|---|---|
| 2006/0018397 A1* | 1/2006 | Sampath | ............... | H04L 1/0003 375/267 |
| 2013/0039349 A1* | 2/2013 | Ebrahimi Tazeh Mahalleh | .............. | H04L 1/0013 370/336 |
| 2014/0044211 A1* | 2/2014 | Hammarwall | ....... | H04B 7/0634 375/267 |
| 2016/0006553 A1* | 1/2016 | Kim | ...................... | H04L 1/1671 370/252 |

OTHER PUBLICATIONS

Zhang et al., "Optimization of Transmission Spatial Layer Selection with Unreliable RI in MIMO-OFDM system," in 9th International Conference on Fuzzy Systems and Knowledge Discovery, School of Engineering and Design, Brunel University, 2012, pp. 1598-1602.*

* cited by examiner

*Primary Examiner* — Sam K Ahn
*Assistant Examiner* — Janice Tieu
(74) *Attorney, Agent, or Firm* — Imperium Patent Works; Zheng Jin

(57) ABSTRACT

A method of transmitting extra spatial layers over a wireless channel is proposed. In one exemplary embodiment, the invention is directed to a method for scheduling higher number of layers than the preferred number reported from a mobile. In one exemplary embodiment, the invention is directed to a method for reporting multiple precoding candidates for the rank that is higher than the preferred rank reported from a mobile. In one exemplary embodiment, the invention is directed to a method for appending extra columns in the precoding matrix for the extra layers that a base station transmits. In one exemplary embodiment, the invention is directed to a method for transmitting extra data streams on the same wireless channel. In one exemplary embodiment, the invention is directed to a method for saving battery power utilizing the extra layers.

21 Claims, 4 Drawing Sheets

METHOD FOR TRANSMITTING EXTRA SPATIAL LAYERS OVER THE WIRELESS CHANNEL

TECHNICAL FIELD

The disclosed embodiments relate generally to wireless network communications, and, more particularly, to methods for transmitting multiple signals simultaneously at the base station.

BACKGROUND

The use of multiple antennas at both the transmitter and receiver of a wireless communication system along with related baseband signal processing is referred to as Multiple-Input Multiple-Output (MIMO) technology. In a MU-MIMO system, precoding is applied at the transmitter in order to suppress mutual interference experienced by each receiving station caused by transmissions to other receiving stations. To those skilled in the art, MU-MIMO precoding, refers to spatial encoding of the transmitted signal based on propagation channel. In order to apply MU-MIMO precoding, the transmitting station is required to know the Channel State Information (CSI) of the radio channels connecting it to each of the receiving stations for transmission. In 3GPP LTE systems, it is common for the receiving stations (e.g., user equipments) to measure CSI and report CSI to the transmitting station (e.g., eNodeB) via an uplink feedback channel. The content of CSI feedback contains RI (rank indicator), CQI (channel quality indicator), and PMI (precoding matrix indicator) for each downlink component carrier (CC).

MIMO transmission technique is essential to achieve higher data throughput utilizing spatial characteristics of the wireless channel. For example, by utilizing spatial multiplexing techniques, multiple streams of signals can be transmitted over multiple layers from a base station to user equipments (UEs) achieving higher data throughput. In general, this can be achieved with some knowledge of the downlink channel, which can be obtained from UE feedback or estimated by the base station via channel reciprocity. Taking downlink FDD LTE for example, the UE feedback CSI information contains RI, CQI, and PMI. Other wireless communication standards such as Wi-Fi also define similar mechanism for spatial multiplexing.

Currently, most hand-held mobile devices are expected to have two receive antennas, and most receiving and transmitting techniques are developed with this expectation. Although the base station can be equipped with more antennas than the mobile device, the maximum rank of the overall wireless channel is limited by the minimum antenna configuration on either side. As a result, the maximum rank of the wireless channel is two. The rank determines the maximum number of spatial layers that can be transmitted without severe cross interference between the layers, under ideal conditions. For example, the base station can transmit two streams simultaneously over two layers if the rank is two. This case is usually expected to happen when the mobile device enjoys high signal quality, e.g., when it communicates with a very close base station in a small cell.

To realize spatial multiplexing in wireless communication systems, a mobile device reports its preferred number of spatial transmission layers, i.e. its rank to its serving base station. The periodicity of this operation can be configured differently. Under the assumption of two receive antennas, the maximum possible rank of the wireless channel is two. The base station usually adopts the recommendation in the UE report in its downlink scheduling.

A solution for transmitting higher number of layers in the downlink than the number of receive antennas, the rank of the wireless channel, or the recommended value from the UE is sought.

SUMMARY

A method of transmitting more spatial layers over a wireless channel than the rank of the wireless channel or the feedback value recommended from a mobile device is proposed. In one exemplary embodiment, the invention is directed to a method for scheduling higher number of layers than the preferred number reported from a mobile. In one exemplary embodiment, the invention is directed to a method for reporting multiple precoding candidates for the rank that is higher than the preferred rank reported from a mobile. In one exemplary embodiment, the invention is directed to a method for appending extra columns in the precoding matrix for the extra layer that a base station transmits. In one exemplary embodiment, the invention is directed to a method for transmitting extra data streams on the same wireless channel. In one exemplary embodiment, the invention is directed to a method for saving battery power utilizing extra layers.

From base station perspective, a base station receives channel state information (CSI) from a user equipment (UE) in a mobile communication network. The CSI comprises a rank indicator (RI) indicating a channel rank, a precoding matrix indicator (PMI) indicating an original precoding matrix. The base station then determines a number of spatial layers that is more than the channel rank requested by the UE. The base station then appends additional precoding vectors in the original precoding matrix for form a new precoding matrix. Finally, the base station transmits data over the spatial layers using the new precoding matrix. The additional precoding vectors are determined to substantially minimize inter-layer interference among the spatial layers. The base station may also receive an additional PMI for higher rank from the UE when determining the additional precoding vectors. In one embodiment, each of the additional precoding vectors (and optionally each column of the original precoding matrix as well) is applied with a corresponding power factor to reduce inter-layer interference. In another embodiment, the data comprises an original data portion corresponds to the original precoding matrix and a new data portion corresponds to the additional precoding vectors, and the new data portion (and optionally the original data portion as well) is applied with lower order to modulation to reduce inter-layer interference. In yet another embodiment, the original data portion and the new data portion are transmitted from the base station to different mobile devices.

From UE perspective, a user equipment (UE) estimates channel station information (CSI) in a mobile communication network. The CSI comprises a rank indicator (RI) indicating a channel rank, a precoding matrix indicator (PMI) indicating an original precoding matrix. The UE then transmits the CSI as feedback information to a base station. The UE then receives data over a number of spatial layers that is more than the channel rank. The data is precoded by the base station with a new precoding matrix having additional precoding vectors. Finally, the UE decodes the data over the spatial layers using an advance receiver that cancels inter-layer interference among the spatial layers. In one embodiment, the UE feedbacks the PMI for the selected rank, as well as additional PMIs for higher rank to help the base station determining the additional precoding vectors. In another embodiment, the use of higher number of spatial layers for downlink transmission can also help to mitigate the battery-draining problem of the UE.

Other embodiments and advantages are described in the detailed description below. This summary does not purport to define the invention. The invention is defined by the claims.

DETAILED DESCRIPTION

Figure 1:
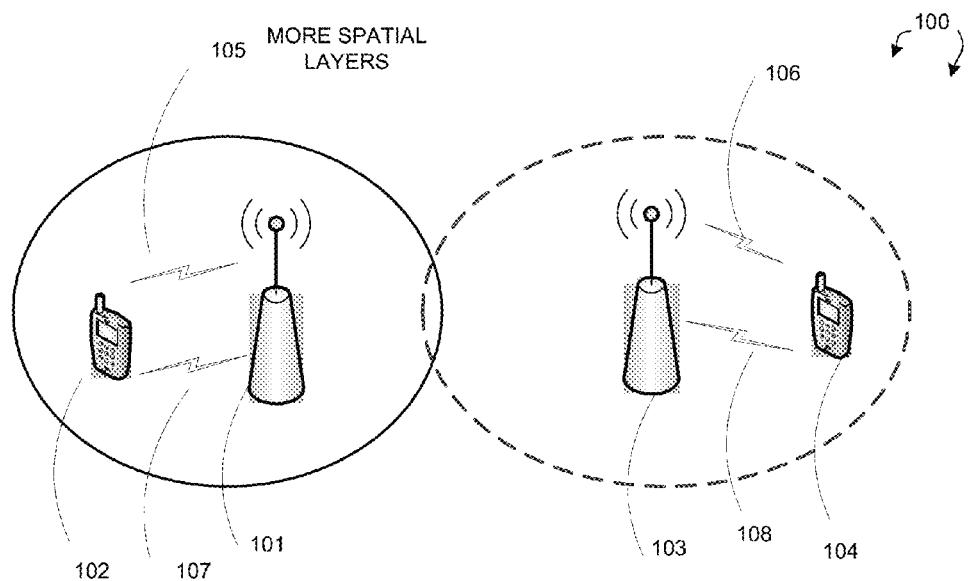
FIG. 1 illustrates spatial multiplexing in a mobile communication system with interference in accordance with one novel aspect.

Reference will now be made in detail to some embodiments of the invention, examples of which are illustrated in the accompanying drawings.

Several exemplary embodiments of the present disclosure are described with reference to FIG. 1, which generally relates to a method for precoding of messages transmitted via a wireless channel. It is to be understood that the following disclosure provides various embodiments as examples for implementing different features of the present disclosure. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not dictate a relationship between the various described embodiments and/or configurations.

FIG. 1 illustrates spatial multiplexing in a wireless communications system 100 with interference in accordance with one novel aspect. In FIG. 1, the wireless communications system 100 comprises one or more fixed base infrastructure units forming a network distributed over a geographical region. The base unit may also be referred to as an access point, access terminal, base station, Node-B, eNode-B, or by other terminology used in the art. In FIG. 1, the base unit 101 serves a remote unit 102 within a serving area, for example, a cell, or within a cell sector. In some systems, one or more base units are communicably coupled to a controller forming an access network that is communicably coupled to one or more core networks. The disclosure however is not intended to be limited to any particular wireless communications system. Generally, the serving base units 101 and 103 transmit downlink communication signals 105 and 106 to remote units 102 and 104 in the time and/or frequency domain. The remote mobiles transmit uplink signals 107 and 108 to the serving units 101 and 103.

Most wireless communication standards define a method for some kind of spatial multiplexing. Examples include codebook-based spatial multiplexing in LTE and/or Wi-Fi. In general, to realize spatial multiplexing in wireless communication systems, a mobile device reports its preferred precoding and/or characteristics of the current wireless channel it observes. This information, also referred to as Channel State Information (CSI), is sent back to the base station so that they are used in the near future downlink scheduling and data transmission. This feedback information is usually determined by comparing some metric e.g., capacity and/or expected SNR etc. Currently, a mobile device such as a cell phone is expected to have two receive antennas due to a physical size constraint, and this makes the maximum rank of the channel to two. The rank determines the maximum number of spatial layers that can be transmitted without severe cross interference between the layers, under ideal conditions. For example, the base station can transmit two streams simultaneously over two layers if the rank is two. This case is usually expected to happen when the mobile device enjoys high SNR e.g., when it communicates with a very close base station in a small cell.

When the scheduled rank is two or more with some non-ideal quantized pre-coders, each stream naturally experiences interference from each other, which is called inter-layer interference. In general, this type of interference can be mitigated at the receiver through a successive interference cancellation (SIC) receiver or maximum likelihood (ML) detector. When the interference is carefully controlled at a tolerable level, then some types of simplified ML detector (e.g., sphere detector) can also perform as good as the full-blown ML detector by providing considerable complexity reduction.

Due to the advent of fast hardware (FPGA, ASIC or DSP), a complicated receiver are being adopted in many wireless communication standards. For example, in LTE release 12, the use of an advanced receiver for inter-cell interference cancellation has been specified. With the mandatory use of advanced receiver, ML/SIC receiver is now widely used in many different scenarios. In addition, with the popularity of tablet devices, the number of receive antennas could be increasing. As a result, an advanced receiver that can handle three or more spatial layers becomes more and more realistic.

In accordance with one novel aspect, the use of more spatial layers in downlink transmission than the number of receive antennas, the rank of the channel, or the requested value from a mobile. In the example of FIG. 1, when mobile unit 102 reports a single layer transmission to base unit 101 via uplink transmission 107, the base station 101 can schedule two layers for downlink transmission 105. Similarly, if mobile unit 102 asks two layer transmissions, the base station 101 can schedule three or more layers. This kind of scheduling behavior will results in inevitable interference between each layers. This will affect negatively in the receive SNR that the mobile observes if not carefully controlled. However, considering the mobile's capability of cancelling inter-layer interference, the loss due to the inter-layer interference can be compensated, allowing the system to achieve the same or similar throughput as with original precoding matrix that is recommended by a mobile.

Figure 2:
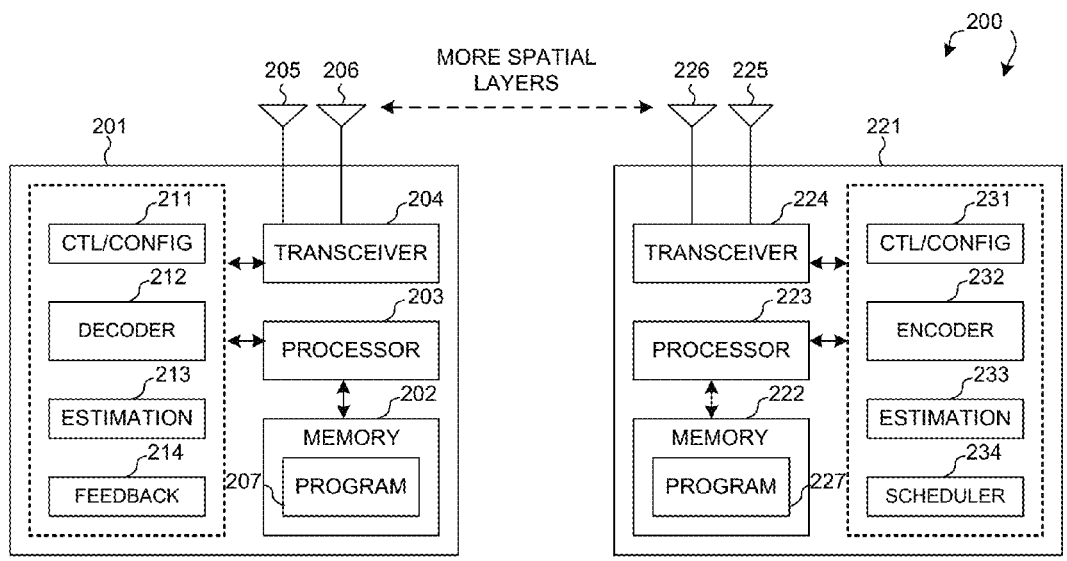
FIG. 2 illustrates simplified block diagrams of a user equipment and a base station in a wireless system in accordance with one novel aspect.

FIG. 2 illustrates simplified block diagrams of a user equipment 201 and a base station 221 in a wireless system in accordance with one novel aspect. UE 201 comprises memory 202, a processor 203, an RF transceiver 204, and antennas 205 and 206. RF transceiver 204, coupled with antennas 205 and 206, receives RF signals from the antennas, converts them to baseband signals and sends them to processor 203. RF transceiver 204 also converts received baseband signals from processor 203, converts them to RF signals, and sends out to the antennas. Processor 203 processes the received baseband signals and invokes different functional modules to perform features in UE 201. Memory 202 stores program instructions and data 207 to control the operations of UE 201.

Similarly, eNodeB 221 comprises memory 222, a processor 223, a transceiver 224 coupled to multiple antennas 225 and 226. The program instructions and data 207 and 227, when executed by processors 203 and 223, enables UE 201 and eNodeB 221 to perform downlink transmission with more spatial layers according to novel aspects of the invention.

UE 201 also comprises various function modules including a control and configuration module 211 that receives control and configuration information from the network, a decoder 212 that decodes UE information, a channel estimation module 213 that performs downlink channel estimation, and a feedback module 214 that provides CSI feedback information. Similarly, eNodeB 221 also comprises various function modules including a control and configuration module 231, an encoder 232 that encodes UE information, a channel estimation module 233 that performs uplink channel estimation, and a scheduler 234 that schedules downlink transmission with spatial multiplexing based on CSI feedback information from the UE. The different components and modules may be implemented in a combination of hardware circuits and firmware/software codes being executable by processors 203 and 223 to perform the desired functions.

Figure 3:
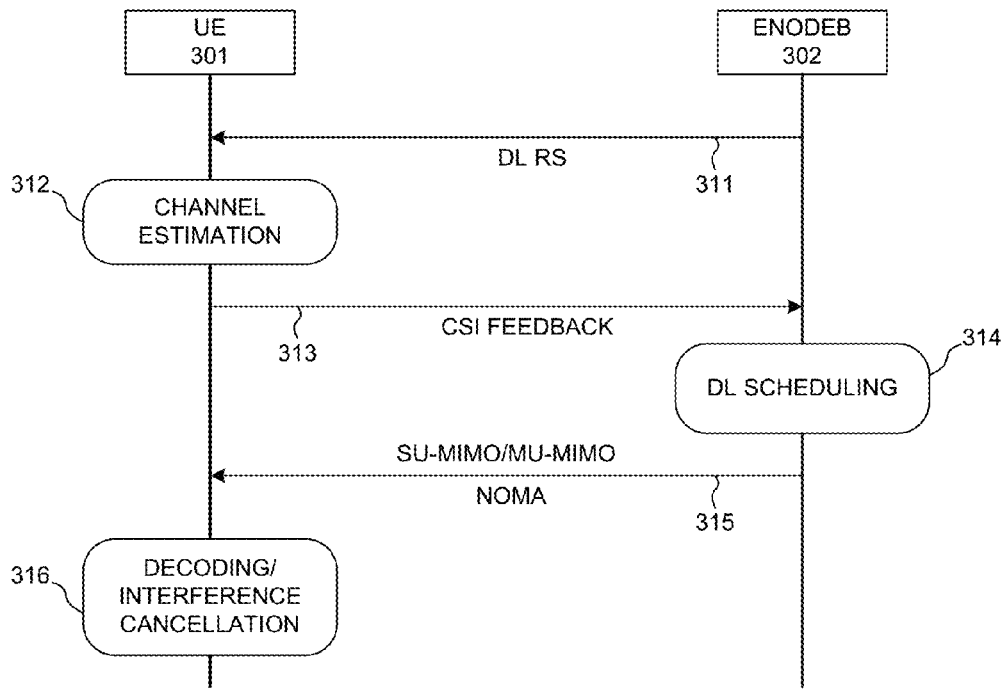
FIG. 3 illustrates a method of using more spatial layers in downlink transmission than the number of receive antennas, the channel rank, or the recommended value from a mobile device.

FIG. 3 illustrates a method of using more spatial layers in downlink transmission than the number of receive antennas, the channel rank, or the recommended value from a mobile device. The wireless communications system in FIG. 3 comprises a user equipment UE 301 and a base station eNodeB 302. In step 311, eNodeB 302 transmits a downlink reference signal to UE 301 over a wireless channel. In step 312, UE 301 performs channel estimation based on the received downlink reference signal. UE 301 estimates the channel state information (CSI), which includes RI (rank indicator), CQI (channel quality indicator), and PMI (precoding matrix indicator) associated with the wireless channel. In step 313, UE 301 sends the CSI feedback information to eNodeB 302. In step 314, eNodeB 302 performs downlink scheduling for UE 301 based on the received CSI feedback information. In one novel aspect, eNodeB 302 schedules data to be transmitted over more spatial layers than recommended by UE 301. In step 315, eNodeB 302 transmits the data to UE 301 (and other UEs) over the spatial layers via SU-MIMO, MU-MIMO, or via NOMA. In step 316, UE 301 decodes the received data over the spatial layers. UE 301 applies receiver's advanced processing (e.g., SIC or ML) to cancel the inter-layer interference.

In general, the technique in this disclosure can be applied to both frequency division duplex (FDD) and time division duplex (TDD) systems. When time division duplex (TDD) is employed in the system, the mobile does not need to feed back the channel-related information. In this case, the base station can estimate the downlink channel using the uplink reference (or pilot) signals and the property of channel reciprocity.

Figure 4:
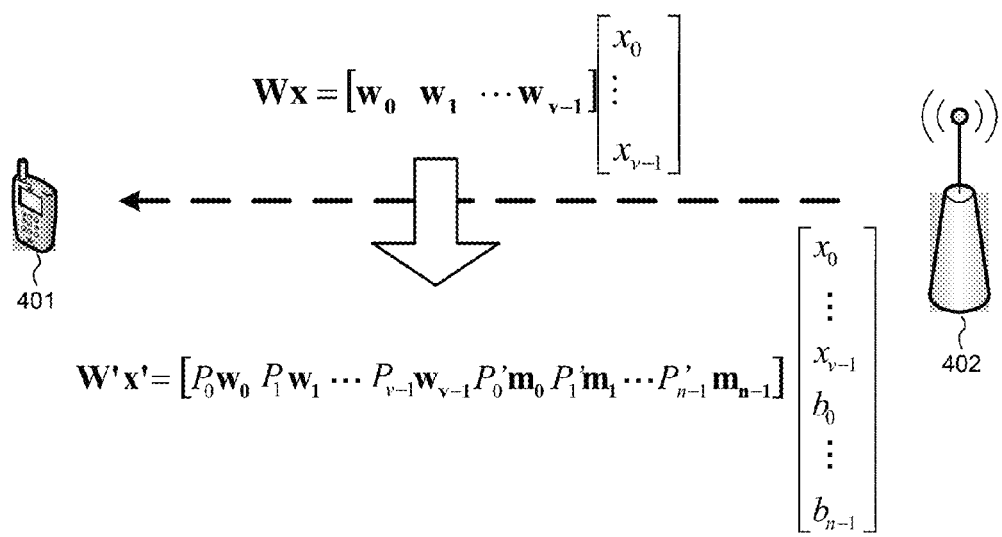
FIG. 4 illustrates the transmitted signal using the original number of spatial layers and the transmitted signal using more spatial layers.

FIG. 4 illustrates the transmitted signal using the original number of spatial layers and the transmitted signal using more spatial layers. In the example of FIG. 4, base station eNodeB 402 transmits data/message vector x to UE 401 after applying a precoding matrix W. Typically, the original precoding matrix W is recommended by UE 401 via a precoding matrix indicator (PMI), and eNodeB 402 just uses the corresponding precoding matrix. The original transmitted signal can be represented as:

$$Wx = [w_0 \; w_1 \; \ldots \; w_{v-1}] \begin{bmatrix} x_0 \\ \vdots \\ x_{v-1} \end{bmatrix}$$

where
  matrix W is the original precoding matrix having the dimension $(N_t \times v)$
  scaler v is the number of spatial layers of the precoder
  column vector $w_i$ represents each column in W
  column vector x is the original message vector with the dimension of $(v \times 1)$ In accordance with one novel aspect, one or more columns are appended in W (i.e. W becomes $(N_t \times (v+n))$, where n is the number of extra layers that are appended. Similarly, column vector x becomes $((v+n) \times 1)$. In addition, another extra parameter is added to control the power of each precoding vectors. As a result, the new transmit signal can be written as:

$$W'x' = [P_0 w_0 \; P_1 w_1 \; \ldots \; P_{v-1} w_{v-1} \; P'_0 m_0 \; P'_1 m_1 \; \ldots \; P'_{n-1} m_{n-1}] \begin{bmatrix} x_0 \\ \vdots \\ x_{v-1} \\ b_0 \\ \vdots \\ b_{n-1} \end{bmatrix}$$

where
  matrix W' is the new precoding matrix having the dimension $(N_t \times (v+n))$
  scaler $(v+n)$ is the total number of spatial layers of the new precoder
  column vector $w_i$ represents each column in W
  column vector x' is the new message vector with the dimension of $((v+n) \times 1)$
  column vector $m_i$ are the newly appended columns in the new precoding matrix W'
  scalar $P_i$ is the power control constant of each original spatial layer
  scalar $P'_i$ is the power control constant of each appended spatial layer
  symbols $b_i$ are the new messages to be transmitted over the new spatial layers. They can come from different constellations (i.e., different modulation format) from the one used by the original data $x_i$ This augmented model can be used for SU-MIMO to transmit more spatial layers relying on the receiver's advanced processing. If this model used with multiple mobiles (i.e., $x_i$ and $b_i$ are intended for different mobiles), then it effectively becomes MU-MIMO transmissions or non-orthogonal multiple access (NOMA).

Given the fixed number of maximum rank (e.g., two receive antennas) and $w_i$, designing another orthogonal vector $m_i$ with only the feedback from the receiver is difficult. Any new columns will likely cause interference to the layer directed by one of the existing vector, i.e. $w_i$. In one advantageous aspect, if the selected rank is less than the maximum rank, it is proposed that the mobile reports the best precoding matrix for the selected rank, and one or more precoding matrixes for higher rank.

For example, assuming FDD, if UE 401 determines that rank 1 is best and $w_1$ is the corresponding desired precoder, then it reports the best precoder $W_1$ to eNodeB 402, as well as the best precoder for rank 2, say $W_2$ to eNodeB 402. In this specific example, the base station 402 then can adopt $W_2$ when it wants to add an extra layer. In TDD with non-codebook based spatial multiplexing, the situation becomes even simpler. The base station has more freedom to select precoder. Since the base station has the exact channel information, it can calculate more sophisticated precoder with varying number of layers.

When the overall communication system does not define precoding matrices for higher rank than the selected value (e.g., when a mobile selects rank two, and rank 3 precoders are not defined), the base station then has to calculate the extra columns $m_i$. In this case, the spatial direction specified by the extra columns $m_i$ will be non-orthogonal to the existing precoders $w_i$. However, it is believed that there are more spatial dimensions to play with when the number of receive antennas increases. In other words, the new vectors can be chosen with many different selection strategies.

In this case, the amount of interference power for $m_i$ can also be controlled using the power control parameter, i.e., $P'_i$. Furthermore, some amount of interference can also be cancelled after the ML or SIC processing of the mobile station. The power control constant can be derived from the modulation and coding scheme (MCS) and/or the data rate of the new layer. For example, if the data rate is low, a smaller constant can be used to avoid high inter-layer interference. In another example, additional power control parameter $P_i$ can be applied to the original precoding vectors $w_i$ as well to reduce overall inter-layer interference.

The power control constant can also be determined from the amount of interference it causes. In other words, if the amount of inter-layer interference (e.g., the norm or any other similar metric of inner product between two columns in the precoding matrix) is large, then the constant can be set small to reduce the overall inter-layer interference. In other words, the power control constant is inversely proportional to the correlation of the two vectors $w_i$ and $m_i$.

Figure 5:
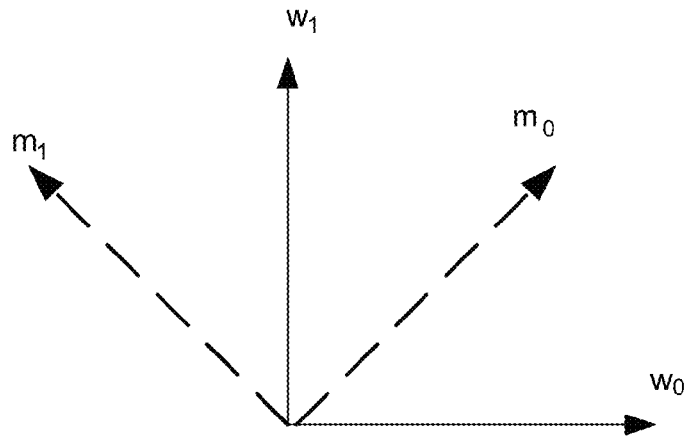
FIG. 5 illustrates one embodiment of choosing additional precoding vectors on top of the original precoding matrix.

FIG. 5 illustrates one embodiment of choosing additional precoding vectors $m_i$ on top of the original precoding matrix W. As illustrated in FIG. 5, when the base station needs to calculate the new precoding vectors, they can be chosen as a new set of vectors such that the new vectors are orthogonal to each other. In addition, because it is desired that the new vectors have small correlation with the existing vectors, it can be also chosen following an optimization rule such as:

$$m_i = \underset{m_i \in C^{N_t}}{\arg\min} \max_{j \in [0, v-1]} w_j^H m_i$$

The modulation of new messages $b_i$ can also be selected differently from the one used by $x_i$ to minimize the negative impact of inter-layer interference. For example, it can be chosen to QPSK (or lowest order modulation that the system supports (e.g., BPSK)) so that $b_i$ itself can be successfully decoded with high probability even with the interference from other layers. In this case, the successfully decoded message can be very helpful if SIC receiver is employed. In this way, the newly appended layers can be used for transmitting low rate data, as it does not require higher order modulation. In another example, the modulation order of original messages $x_i$ can also be lowered to help minimize the negative impact of inter-layer interference. In one specific example, the modulation order of original message $x_i$ is 64QAM, and message $x_i$ is intended for mobile device #1. With the additional spatial layer, the modulation order of $x_i$ is lowered from 64QAM to 16QAM. The modulation order of the new message $b_i$ is QPSK, and message $b_i$ is intended for mobile device #2.

When the interference is carefully controlled using lower order modulations, the use of higher number of layers can also help to mitigate the battery-draining problem. Lower order modulations lead to the smaller number of possibility during the search process in the receiver. They are also more resilient to noise. Therefore, by achieving the lower interference thanks to the abovementioned methods and a simplified ML detector (e.g., sphere detector), the overall error rate can be maintained at the certain desired level. In this way, the use of more layers can reduce the battery consumption. Furthermore, because lower order modulation with more layers is more resilient to noise, it can possibly help reducing the number of retransmission (i.e. HARQ operation), resulting in the similar throughput as less layers with a higher order of modulation.

Figure 6:
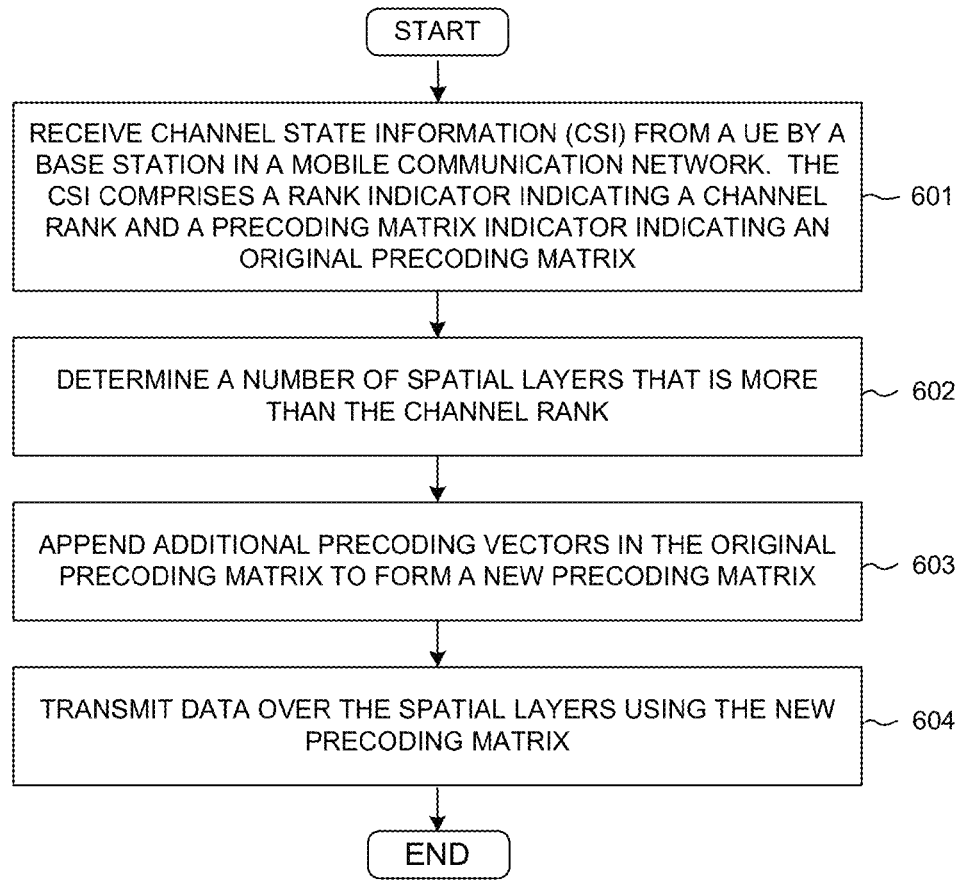
FIG. 6 is a flow chart of a method of transmitting extra spatial layers from base station perspective in accordance with one novel aspect.

FIG. 6 is a flow chart of a method of transmitting extra spatial layers from base station perspective in accordance with one novel aspect. In step 601, a base station receives channel state information (CSI) from a user equipment (UE) in a mobile communication network. The CSI comprises a rank indicator (RI) indicating a channel rank, a precoding matrix indicator (PMI) indicating an original precoding matrix. In step 602, the base station determines a number of spatial layers that is more than the channel rank requested by the UE. In step 603, the base station appends additional precoding vectors in the original precoding matrix for form a new precoding matrix. In step 604, the base station transmits data over the spatial layers using the new precoding matrix. The additional precoding vectors are determined to substantially minimize inter-layer interference among the spatial layers. The base station may also receive an additional PMI for higher rank from the UE when determining the additional precoding vectors. In one embodiment, each of the additional precoding vectors (and optionally each column of the original precoding matrix as well) is applied with a corresponding power factor to reduce inter-layer interference. In another embodiment, the data comprises an original data portion corresponds to the original precoding matrix and a new data portion corresponds to the additional precoding vectors, and the new data portion (and optionally the original data portion as well) is applied with lower order of modulation to reduce inter-layer interference. In yet another embodiment, the original data portion and the new data portion are transmitted from the base station to different mobile devices.

Figure 7:
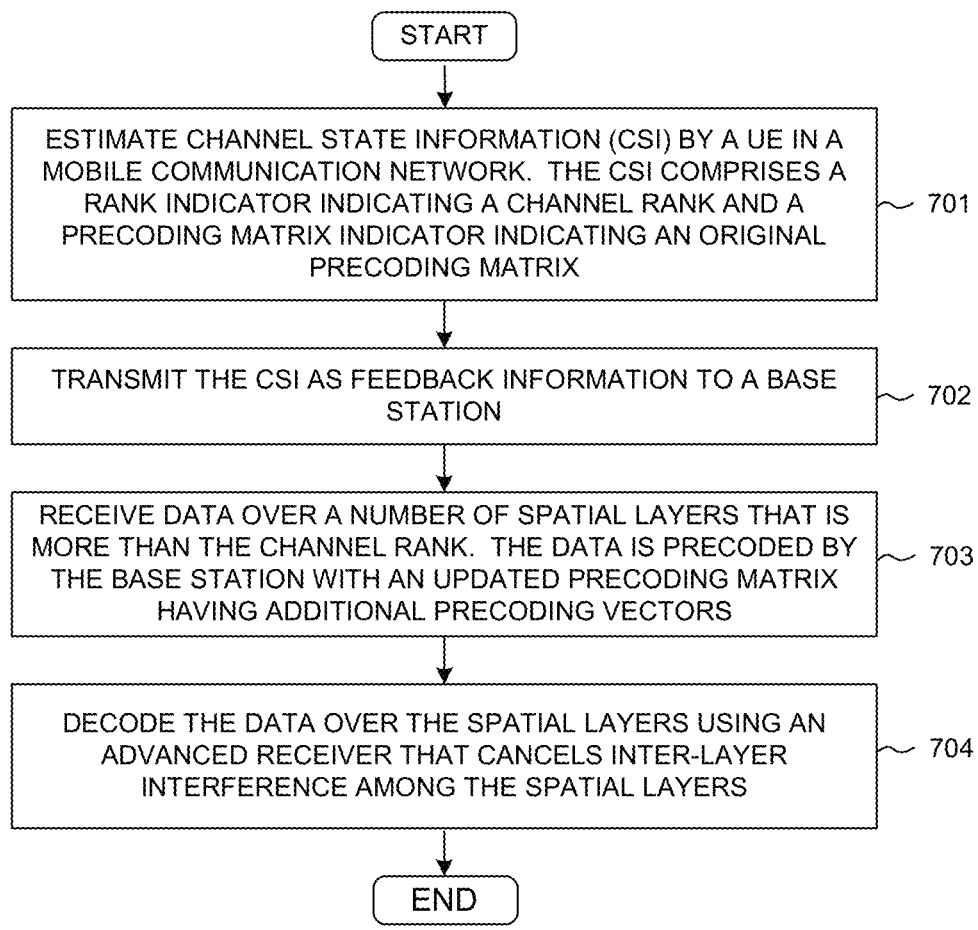
FIG. 7 is a flow chart of a method of transmitting extra spatial layers from user equipment perspective in accordance with one novel aspect.

FIG. 7 is a flow chart of a method of transmitting extra spatial layers from user equipment perspective in accordance with one novel aspect. In step 701, a user equipment (UE) estimates channel station information (CSI) in a mobile communication network. The CSI comprises a rank indicator (RI) indicating a channel rank, a precoding matrix indicator (PMI) indicating an original precoding matrix. In step 702, the UE transmits the CSI as feedback information to a base station. In step 703, the UE receives data over a number of spatial layers that is more than the channel rank. The data is precoded by the base station with a new precoding matrix having additional precoding vectors. In step 704, the UE decodes the data over the spatial layers using an advance receiver that cancels inter-layer interference among the spatial layers. In one embodiment, the UE feedbacks the PMI for the selected rank, as well as additional PMIs for higher rank to help the base station determining the additional precoding vectors. In another embodiment, the use of higher number of spatial layers for downlink transmission can also help to mitigate the battery-draining problem of the UE.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   (a) receiving channel state information (CSI) from a user equipment (UE) by a base station in a mobile communication network, wherein the CSI comprises a rank indicator indicating a channel rank and a precoding matrix indicator indicating an original precoding matrix;
   (b) determining a number of spatial layers that is more than the channel rank;
   (c) appending additional precoding vectors in the original precoding matrix to form a new precoding matrix; and
   (d) transmitting data over the spatial layers using the new precoding matrix.

2. The method of claim 1, wherein the additional precoding vectors are determined to substantially minimize inter-layer interference among the spatial layers.

3. The method of claim 1, wherein the base station determines the additional precoding vectors based on an additional precoding matrix indicator for a higher channel rank transmitted by the UE.

4. The method of claim 1, wherein each column of the new precoding matrix is applied with a corresponding power factor to reduce inter-layer interference.

5. The method of claim 1, wherein the data comprises an original data portion corresponds to the original precoding matrix and a new data portion corresponds to the additional precoding vectors.

6. The method of claim 5, wherein the new data portion is applied with a lower order of modulation than the original data portion.

7. The method of claim 5, wherein both the original data portion and the new data portion are applied with a low order of modulation to reduce inter-layer interference among the spatial layers.

8. A method comprising:
   (a) estimating channel state information (CSI) by a user equipment (UE) in a mobile communication network, wherein the CSI comprises a rank indicator indicating a channel rank and a precoding matrix indicator (PMI) indicating an original precoding matrix;
   (b) transmitting the CSI as feedback information to a base station;
   (c) receiving data over a number of spatial layers that is more than the channel rank, wherein the data is precoded by the base station with a new precoding matrix having additional precoding vectors; and
   (d) decoding the data over the spatial layers using an advanced receiver that cancels inter-layer interference among the spatial layers.

9. The method of claim 8, wherein the UE also feedbacks additional recommended PMIs for determining the additional precoding vectors.

10. The method of claim 8, wherein each of the additional precoding vectors is applied with a corresponding power factor to reduce inter-layer interference.

11. The method of claim 8, wherein each column of the original precoding matrix is applied with a corresponding power factor to reduce inter-layer interference.

12. The method of claim 8, wherein the data comprises an original data portion corresponds to the original precoding matrix and a new data portion corresponds to the additional precoding vectors.

13. The method of claim 12, wherein the new data portion is applied with a lower order of modulation than the original data portion.

14. The method of claim 12, wherein both the original data portion and the new data portion are applied with a low order of modulation to reduce inter-layer interference among the spatial layers.

15. A user equipment, comprising:
   a channel estimation module that estimates channel state information (CSI) in a mobile communication network, wherein the CSI comprises a rank indicator indicating a channel rank and a precoding matrix indicator indicating an original precoding matrix;
   a transmitter that transmits the CSI as feedback information to a base station; and
   an advanced receiver that receives data over a number of spatial layers that is more than the channel rank, wherein the data is precoded by the base station with a new precoding matrix having additional precoding vectors, and wherein the data is decoded by the receiver over the spatial layers that cancels inter-layer interference among the spatial layers.

16. The UE of claim 15, wherein the UE also feedbacks additional recommended PMIs for determining the additional precoding vectors.

17. The UE of claim 15, wherein each of the additional precoding vectors is applied with a corresponding power factor to reduce inter-layer interference.

18. The UE of claim 15, wherein each column of the original precoding matrix is applied with a corresponding power factor to reduce inter-layer interference.

19. The UE of claim 15, wherein the data comprises an original data portion corresponds to the original precoding matrix and a new data portion corresponds to the additional precoding vectors.

20. The UE of claim 19, wherein the new data portion is applied with a lower order of modulation than the original data portion.

21. The UE of claim 19, wherein both the original data portion and the new data portion are applied with a low order of modulation to reduce inter-layer interference among the spatial layers.

* * * * *